C. C. BROOKS.
STREET SWEEPER.
APPLICATION FILED JULY 5, 1910.
982,570.
Patented Jan. 24, 1911.
2 SHEETS—SHEET 1.
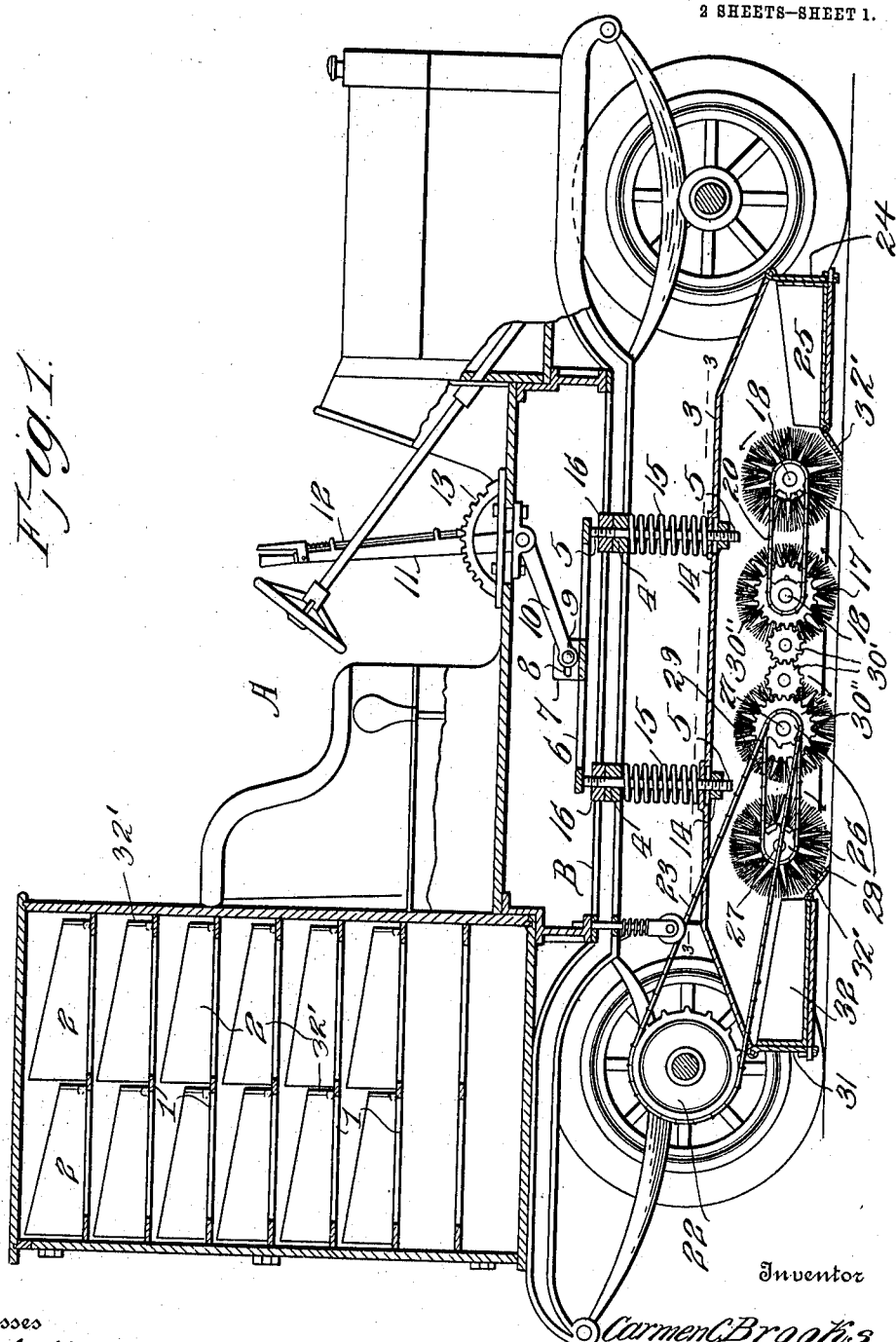
Witnesses
Frank Hough
Inventor
Carmen C. Brooks,
By Victor J. Evans
Attorney

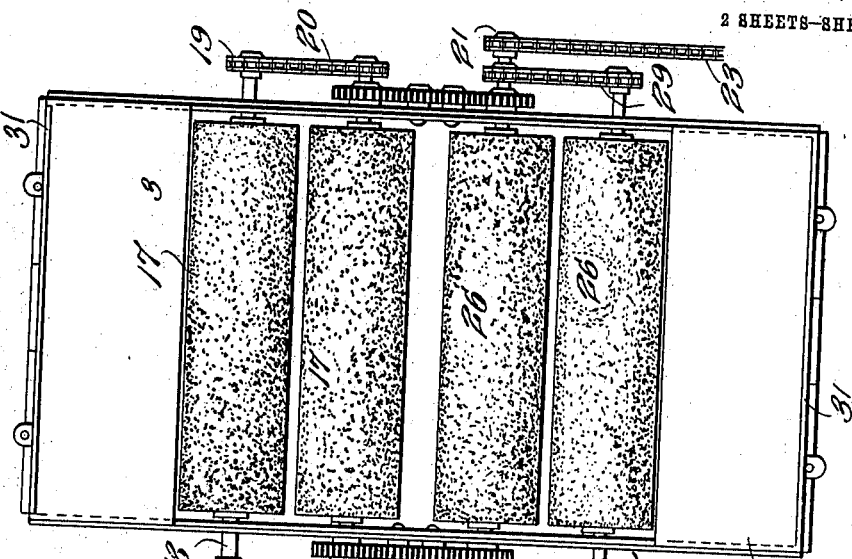
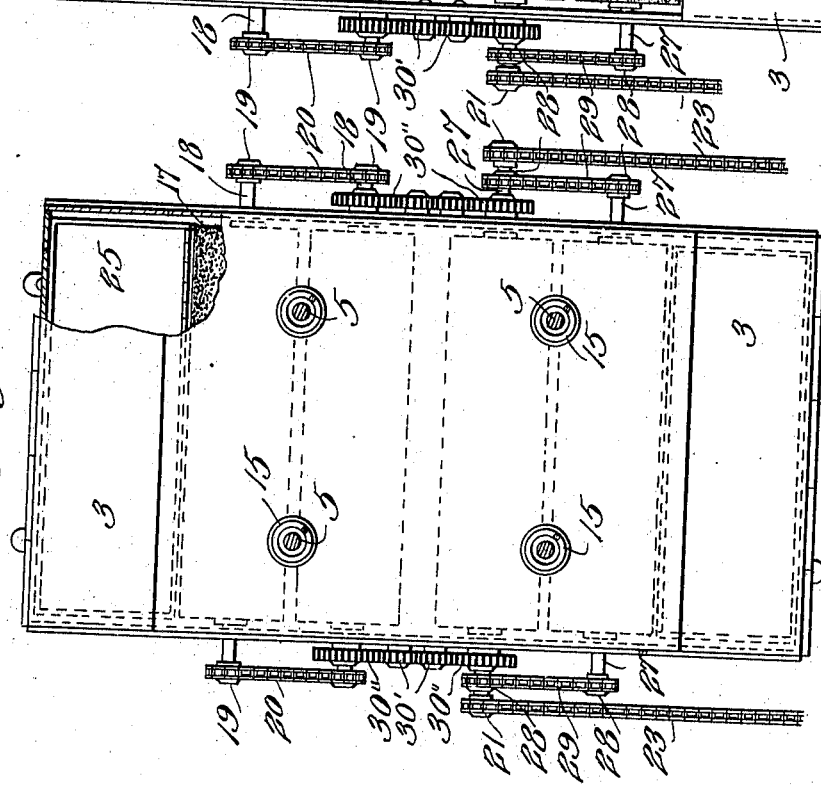

UNITED STATES PATENT OFFICE.

CARMEN C. BROOKS, OF HAXTUM, COLORADO.

STREET-SWEEPER.

982,570.  Specification of Letters Patent.  Patented Jan. 24, 1911.

Application filed July 5, 1910. Serial No. 570,447.

*To all whom it may concern:*

Be it known that I, CARMEN C. BROOKS, a citizen of the United States of America, residing at Haxtum, in the county of Phillips and State of Colorado, have invented new and useful Improvements in Street-Sweepers, of which the following is a specification.

This invention relates to street sweepers, and has for an object to provide a structure of this character wherein a yieldingly supported frame for the brushes is carried by the vehicle, means being employed so that the brushes can be conveniently and quickly moved to their operative or inoperative positions.

In the drawings, forming a portion of this specification and in which like numerals of reference indicate similar parts in the several views, Figure 1 is a longitudinal section through my improved sweeper. Fig. 2 is a bottom plan view of the brush casing. Fig. 3 is a detail section taken on the line 3—3 of Fig. 1.

The sweeper consists preferably of a motor vehicle such as the one conventionally shown at A in Fig. 1 of the drawings. This vehicle is provided at its rear end with an inclosure in which is formed a plurality of shelves 1 for the support of the pans 2. The casing 3 for the brushes is located immediately between the front and rear wheels of the vehicle and directly beneath the intermediate portion of the frame B, the said frame having formed therein suitable vertical passages 4 through which the supporting rods or equivalent members 5 extend. These rods are connected with each other by a head 6 from which extends a vertical stem 7 slotted, as shown at 8, for the reception of the pin 9 on the short arm 10 of the pivoted bell-crank lever 11. The lever 11 is provided with a locking dog 12 for engaging the rack 13 to hold the head 6 in the desired adjusted position.

The rods 5 are provided with adjusting nuts 14. On adjustment of the nuts 14 on the rods 5 the desired or necessary tension on the springs 15 can be obtained. The rods 5 are provided with stops 16 to engage the frame of the vehicle to limit the downward movement of the casing. Near the forward end of the casing 3 is located the companion brushes 17 which are mounted on rotary shafts 18 suitably journaled in the sides of the casing. These shafts are provided with sprocket gear wheels 19 over which the sprocket chains 20 extend.

At the front, the casing 3 is provided with a hinged door 24 so as to enable the operator to readily gain access to the removable pan 25. This pan is supported by the bottom of the casing 3 and is located with respect to the brushes 17 so that on their operation the dirt will be collected and thrown directly into the pan. The casing is provided near its rear end with a pair of brushes 26 which are similar to the brushes 17. The shafts 27 of the brushes 26 have suitable sprocket gear wheels 28 secured thereto for the driving chains 29. One of the shafts 27 is provided with a gear wheel 30 which is geared, through the idler gear wheels 30' with a gear wheel 30'' on one of the shafts 18. The casing 3 is provided at its rear end with a closure 31 to enable the operator to gain access to the pan 32. The pans 25 and 32 are removably mounted in the casing as hereinbefore described and when they have been filled they may be placed on the shelves 1 of the vehicle A and replaced by empty pans as is obvious. Each pan is provided at its open end with a hingedly mounted apron 32 held into contact with the ground through the engagement therewith of the adjacent brush 26. One of the shafts 27 has secured thereto sprocket gear wheels 21 which are geared with the driving sprocket gears 22 of the vehicle through the chains 23.

The construction described is such that the the brushes 17 will revolve in the same direction but in an opposite direction to the brushes 26. The brushes 17 act as the main collector for collecting the heavier particles of dirt while the brushes 26 act as auxiliary brushes for collecting the lighter or for collecting such particles of dirt that may be left by the brushes 17. After operation of the machine the casing 3 can be moved to an elevated position and the machine may be driven as in the ordinary manner of driving a motor vehicle, the brushes being out of contact with the surface of the ground enables the machine to be propelled with but very little resistance and the machine may be operated at a minimum expense. By employing the springs 15 the brushes 17 and 26 will be allowed to give to any irregularities of the surface of the ground and injury to the casing or to the brushes will be effectively obviated.

I claim:—

1. In a street sweeper, a vehicle, a yieldingly supported casing movably mounted between the front and rear axles of the vehicle, pans removably supported by the casing at the ends thereof, a plurality of pairs of brushes revolubly supported by the casing, driving mechanism for the brushes, the said driving mechanism including means for revolving the respective pairs of brushes in opposite directions and in the direction of the pans at the ends of the casing, and means for moving the casing vertically beneath the vehicle.

2. Sweeping apparatus comprising a portable structure including a frame, a casing having an intermediate open bottom portion, a revolubly mounted brush supported by the casing, a collecting pan supported by the casing and positioned therein adjacent to the brush, a member movably supported by the structure and including depending elements attached at their lower ends to the casing, springs interposed between the casing and frame respectively normally exerting their tension to hold the brush in contact with the surface to be swept, a pivoted lever supported by the structure and connected with the said movable member, and means engaging the lever to hold the casing against the tension of the springs.

3. A street sweeper comprising a wheeled structure, a yieldingly supported casing on the structure and depending therefrom and located between the supporting axles for the wheels of the structure, a plurality of pairs of shafts revolubly mounted in the casing, a brush on each shaft, means connecting each pair of shafts with each other to cause them to rotate in the same direction, gear wheels on the oppositely disposed shafts of the respective pairs of shafts, intermeshing gear wheels supported by the casing and meshing with the said first named gear wheels to revolve them in opposite directions, and driving means connecting one of the axles of the said wheels of the structure with the shafts of one of the brushes.

In testimony whereof I affix my signature in presence of two witnesses.

CARMEN C. BROOKS.

Witnesses:
DESMOND B. BROOKS,
ARTHUR L. FORD.